United States Patent [19]
Leib et al.

[11] Patent Number: 5,227,859
[45] Date of Patent: Jul. 13, 1993

[54] PASSIVE COHERENT RADIATION DETECTION SYSTEM

[75] Inventors: Kenneth G. Leib, Wantagh; Benjamin J. Pernick, Forest Hills, both of N.Y.

[73] Assignee: Grumman Aerospace Corporation, Bethpage, N.Y.

[21] Appl. No.: 624,712

[22] Filed: Dec. 4, 1990

[51] Int. Cl.⁵ .............................................. G01B 9/021
[52] U.S. Cl. .................... 556/347; 356/348; 356/351; 359/902; 250/226
[58] Field of Search ............... 356/351, 352, 347, 348, 356/328, 73; 250/226; 359/902

[56] References Cited

U.S. PATENT DOCUMENTS

| | | |
|---|---|---|
| 4,153,368 | 5/1979 | Falbel et al. |
| 4,225,782 | 9/1980 | Kuppenheim, Jr. et al. |
| 4,958,892 | 9/1990 | Jannson et al. |
| 4,966,456 | 10/1990 | Shifrin ........................ 356/73 |
| 5,032,026 | 7/1991 | Jouve et al. ................... 356/351 |

OTHER PUBLICATIONS

Pernick et al., "The Formation and Optimization of Interferometric Fringes," *American Journal of Physics*, vol. 46, pp. 90-93, Jan. 1978.

Primary Examiner—Samuel A. Turner
Assistant Examiner—LaCharles Keesee, II
Attorney, Agent, or Firm—Scully, Scott, Murphy & Presser

[57] ABSTRACT

Holographic optical elements are utilized for discriminating between monochromatic, coherent radiation and broadband, noncoherent radiation in passive coherent radiation detection systems such as aircraft warning systems and submarine laser communication systems. Coherent laser light can possess an extremely high energy density, directivity, (i.e., collimation), and a very narrow wavelength band when compared to natural or man-made, broadband white light sources. The concentration of laser light energy by a holographic optical element at the detector stage is a consequence of its special characteristics. Moreover, equally important, the diffracted light distribution in the neighborhood of the detector possesses a unique, bright geometric pattern not readily obtained with noncoherent sources. This geometric pattern is used as a laser wavelength detector for determination of the incident angular direction of the laser beam, as well as a coherent/noncoherent light discriminator. Since it is a passive component, a holographic optical element detects pulsed as well as continuous wave illumination, and some designs are basically independent of wavelength.

29 Claims, 11 Drawing Sheets

PASSIVE COHERENT RADIATION DETECTION SYSTEM

BACKGROUND OF THE INVENTION

1. Field of the Invention

The present invention relates generally to a receiving detector for detecting coherent radiation, typically a laser beam, while discriminating against noncoherent radiation, and has application in the detection of an installation being illuminated by an unknown laser source, and also in laser communication systems, particularly in improving signal to noise ratios therein. In the first application, the detector is capable of determining the wavelength and angle of incidence of the irradiating unknown source of coherent radiation.

More particularly, the subject invention pertains to a passive coherent radiation detection receiver system in which holographic optical elements are used to discriminate between coherent radiation and noncoherent (bright light) radiation. In greater detail, the radiation detection system is capable of detecting the wavelength and angle of incidence of the laser radiation, and is also capable of attenuating or mitigating the incoming beam intensity level by subdivision of the incident beam into a collection of beams. Pursuant to the latter feature, a detector having an array of pixels such as a CCD camera is not saturated.

2. Discussion of the Prior Art

Advances in high energy laser and optical technology that are being incorporated into some current military scenarios stress the need to address three tactical situations, namely, (1) irradiation by a laser beam from a potential adversary, (2) laser communications in space and (3) laser beam communication systems operating through scattering and attenuating mediums such as water in communications with submerged submarines at sea. For example, a sophisticated naval intelligence collection vessel might utilize a searching, interrogating laser beam directed at a friendly aircraft during flyby. Also, the use of a modulated laser beam for communication through a scattering and attenuating medium such as communication with a submerged submarine is an evolving technology. In this scenario, the problem is not concerned with an encounter with an unknown type of laser beam irradiated by a potential adversary, but instead deals with a communication link via a known type of laser beam with a friendly receiver. The problem to overcome in this case is the severly decreased signal strength due to scattering and attenuation of the light received by the submarine's detection system by the water thereabove. Other applications, such as air-to-air encounters and space-based laser systems, also require distinguishing between coherent laser radiation and other sources of noncoherent radiation, or perhaps one from a set of laser wavelengths. These applications require an ability to efficiently collect, store, concentrate and analyze laser signals as they are encountered.

Several technical problems are common to tactical situations arising as a result of the evolving use of lasers for interrogation, intelligence collection, and data transmission, and include discrimination of laser radiation, low signal to noise levels, a range of distinct operating wavelengths, directional sensitivity to source location, propagating beam spatial degradation, accommodating continuous wave or pulsed operation, and real time response.

The present invention provides an ability to detect laser irradiation in the presence of competing, noncoherent background radiation, to measure its wavelength and to determine the angular direction of the irradiating laser beam. At times, the overall background level of noncoherent radiation, which is essentially noise, could be comparable to or even greater in strength than the laser beam, thereby complicating the detection process.

SUMMARY OF THE INVENTION

Accordingly, it is a primary object of the present invention to provide a receiving detector which utilizes a unique holographic optical element for detecting coherent radiation while discriminating against noncoherent radiation.

A further object of the subject invention is the provision of a coherent radiation detection system which has the ability to:

discriminate between coherent (e.g. laser) and noncoherent radiation, either continuous wave or pulsed;

determine laser wavelength(s);

determine the direction of the illuminating beam;

alleviate light saturation of a TV camera or other detector receiver;

allow concurrent viewing of a scene using a TV camera;

annotate video recording devices for later inspection to find frames of interest;

utilize a holographic optical element with a low insertion loss;

utilize a holographic optical element mounted external to a traditional lens system;

utilize a holographic optical element designed for specific detection and wavelength applications;

function with direct or reflected light which may have travelled through a scattering and attenuating medium;

reduce the range of angles incident upon the holographic optical element and/or system detector; and process detector output signals to function as input signals to other components to initiate specific mission actions.

In accordance with the teachings herein, the present invention provides a receiving detector for detecting coherent radiation present in input radiation while discriminating against noncoherent radiation present therein. The receiving detector includes a holographic optical element for receiving the input radiation and for focusing coherent radiation therein to a spot or array of spots at an output plane, and a radiation detector positioned in the output plane for detecting the spot or array of spots. The position of the spot or array of spots is analyzed to determine characteristics of the coherent radiation, such as the wavelength of each source of coherent radiation present in the input radiation, or to determine the angle of incidence of each source of coherent radiation present in the input radiation. The holographic optical element can be a single holographic lens for focusing a single source of coherent radiation to a spot, or a multiple holographic lens for converting a single source of coherent radiation to multiple foci, having prescribed locations with unique patterns.

The radiation detector can be a television camera, possibly with a CCD detector, or can be a film camera, possibly an instant print camera or a 35 mm camera, or a photomultiplier. With a television camera, a recorder can be utilized to record the video signals. Moreover, a fast detector can be positioned outside of the field of view of the detector of a television camera. The output of the fast detector drives an aperture attenuator to prevent pixel saturation of the television camera detector by intense coherent radiation. Moreover, a frame marker circuit can be coupled to the fast detector, and a separate signal present reference channel can also be utilized for analyzing the output of the fast detector.

In one disclosed embodiment, the multiple holographic lens directs wavelengths $\lambda1$ to $\lambda n$ to different sectors 1 to n of the radiation detector to enable the presence of any one of wavelengths $\lambda1$ to $\lambda n$ to be detected.

In some embodiments an angle reducing optical element can be utilized comprising a truncated cone having an internal mirrored surface to reduce the incident angle of light reaching the radiation detector.

In an alternative embodiment, the holographic optical element can be mounted in a turret arrangement of multiple holographic optical elements rotatable about an optical axis parallel to the optical axis of the system, wherein any one of the multiple holographic elements can be rotated in front of the detector.

Many diverse tests of the concepts of the present invention have demonstrated that a holographic optical element effectively discriminates between coherent radiation and the background noncoherent light, and also in determining whether an object (e.g., aircraft, submarine or tank) is being irradiated with a laser beam. Tests have also demonstrated the ability of a holographic optical element to concentrate a laser beam when distorted due to atmospheric effects, adverse reflections and also when distorted by a highly concentrated scattering and absorbing medium. The tests have also demonstrated the ability of a holographic optical element to form bright, unique geometric patterns of the diffracted laser light which can be used to determine the wavelength of the irradiating laser source and its direction with respect to the irradiated object.

BRIEF DESCRIPTION OF THE DRAWINGS

The foregoing objects and advantages of the present invention for a passive coherent radiation detection system may be more readily understood by one skilled in the art with reference being made to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
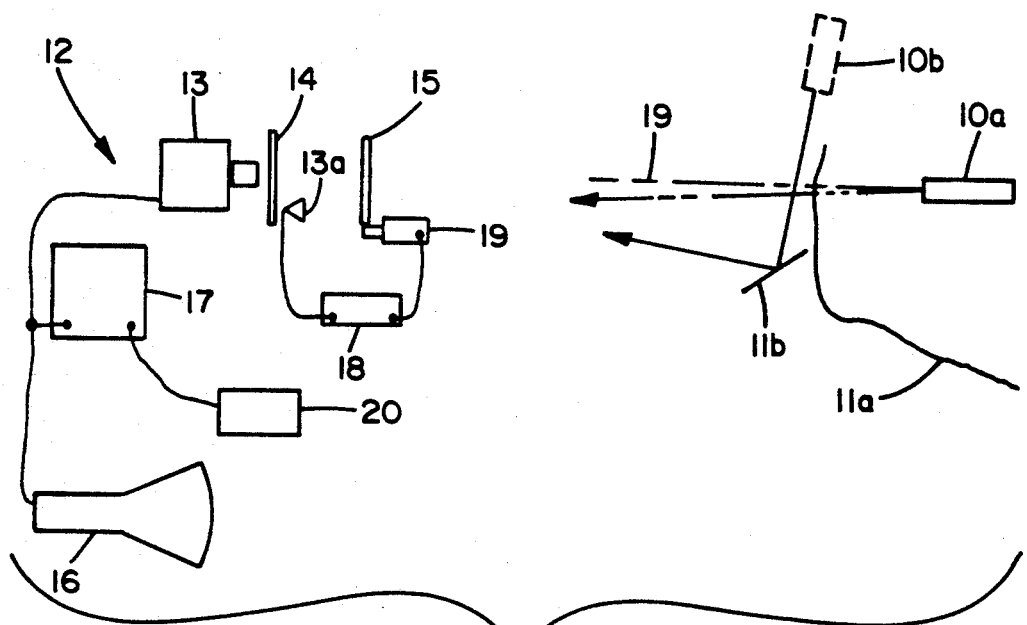
FIG. 1 illustrates a basic scenario to be addressed by the coherent radiation detection system of the present invention in which a laser, possibly from an enemy installation, directs an interrogating laser beam at a target equipped with a receiving system pursuant to the present invention.

FIG. 1 illustrates a basic scenario to be addressed by the coherent radiation detection system of the present invention in which a laser directs an interrogating laser beam at a target equipped with a receiving system pursuant to the present invention. In this context it is desirable to detect the presence of the illuminating laser beam and also to identify its significant characteristics, such as its wavelength and angle of incidence.

Figure 2:
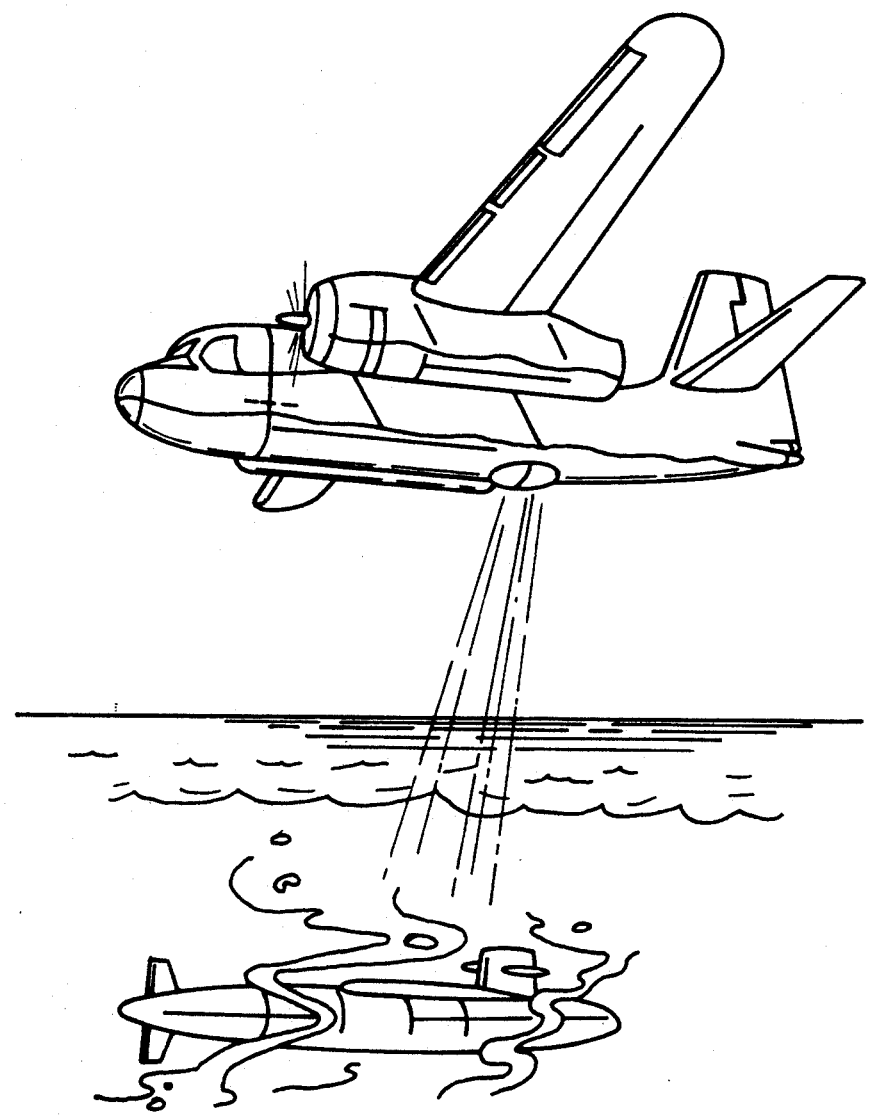
FIG. 2 illustrates another scenario addressed by the present invention in which an aircraft is directing a modulated laser beam for communication with a submerged submarine.

FIG. 2 illustrates another scenario addressed by the present invention in which an aircraft is directing a temporally modulated laser beam for communication with a submerged submarine. In this context, it is desirable for the laser detection system on board the submarine to detect the coherent laser beam despite scattering and attenuation of the beam by the water and also to discriminate against noncoherent radiation which is essentially noise.

In both situations, the present invention utilizes the unique characteristics of holographic optical elements to detect coherent radiation while discriminating against noncoherent background radiation.

The specific holographic optical elements considered herein are a single holographic lens or a multiple holographic lens. These holographic components are used in nonimaging applications where high resolution image formation is not a requirement. They have the ability to concentrate the radiant flux onto a detector, gather light over a large surface area, diffract light into special geometric patterns, and be wavelength selective. These attributes indicate that such holographic optical elements would provide significant improvements for the above mentioned technical areas. Significant advantages of using a holographic lens or a multiple holographic lens over a conventional lens or lens array are the ability to discriminate coherent radiation, low insertion loss, a compact and lightweight structure, and ease of fabrication.

Holographic optical elements include holograms which, upon reconstruction with coherent light, generate wavefronts that replicate wavefronts formed by traditional optical components. Examples are spherical waves (associated with a point source or spherical lens), cylindrical waves (associated with a line source or cylinder lens), a deviated plane wave (associated with a prism), and more complicated wavefronts similar to a combination of conventional optical components (e.g., lens arrays).

Of special interest herein are holographic optical elements that form converging spherical waves, i.e., holographic lenses and multiple holographic lens arrays. To fabricate a holographic lens, one records the interference fringe pattern formed by combinations of plane waves and/or spherical waves from a point source, as described in "Formation and Optimization of Interference Fringes," B. Pernick, K. Leib, *American Journal of Physics*, Vol. 46, pp. 90–93, January 1978. A multiple holographic lens is made in a similar manner, but with repeated exposures of the photographic plate to achieve a spatial offset of the interference fringe patterns associated with each individual exposure. In one mode, the plate is translated or rotated, or some combination thereof, a predetermined amount between exposures to form any suitable pattern. That is, in effect, a step-and-repeat procedure. More efficient multiple holographic lenses are made by using a master multiple holographic lens plate to form the object beam. The waves from each lenslike element in the multiple holographic lens array combine and form complicated interference fringe patterns. A single exposure holographic recording is then made of this pattern, resulting in a copy of the lens array contained in the master multiple holographic lens plate, as described in U.S. patent application Ser. No. 07/253,733, filed Oct. 5, 1988.

A brief description of holographic lens interference fringe patterns provides a useful example to illustrate several important, general holographic optical element characteristics.

The light intensity pattern of the two beams exposing a holographic lens plate is of the form, as described in "Formation and Optimization of Interference Fringes," B. Pernick, K. Leib, *American Journal of Physics*, Vol. 46, pp. 90–93, January 1978.

$$I(x,y,z) = R^2 + S^2/g + (2RS/g)\cos(k(g-sr)+p) \qquad (1)$$

where $I(x,y,z)$ = fringe pattern intensity profile,
$R$ = reference beam amplitude,
$S$ = spherical beam amplitude, $g$ = position between the point source and the plate,
= wavelength, $k$ = wavenumber, $k = 2$
$s$ = direction cosine of the reference beam,
$p$ = constant phase angle, and
$r$ = distance to a point on the plate from the optical axis origin located on the plate.

The interference is present over a volume in which the two beams overlap. A photographic plate is placed in this volume at a specific location and orientation to record the interference fringe pattern that exists in the plane of the plate. The fringe pattern recorded on the photographic plate appears in the form of a family of conic sections.

When the recorded and processed holographic lens is illuminated by a reconstruction beam, three beams emerge from the plate. The beam of interest for this application is one that tends to focus to a small spot. A second beam expands away from the holographic lens as if it is originating from a point source behind the holographic lens. A third beam is simply transmitted through the hologram recording. It is this beam which presents a calibration for the direction of incoming radiation and the wavelength. The expanding beam component is not a functional output in this application. Thus, the hologram of a point source upon reconstruction yields a converging beam which behaves as a lens.

The quality of the focused spot depends upon factors such as the equivalent focal length, linearity, recording beam ratio, and the angle between the beams. For the purposes of this application, aberrations may be present but are not of concern since the holographic lens or multiple holographic lens array is not called upon to provide a high quality image.

Features of paramount interest are the diffraction efficiency, wavelength sensitivity, and angular direction sensitivity. Several materials are available to use for recording the fringe patterns forming a holographic lens or multiple holographic lens, although photographic films and plates are probably the most commonly used recording media. The materials span a wide range of visible wavelength sensitivities and have high spatial resolution, moderate diffraction efficiency, and several emulsion thicknesses (a factor in determining angular sensitivity as explained hereinbelow). Dichromated gelatin is not commercially available and must be prepared by the user, which is a relatively straightforward task. The interest in dichromated gelatin is motivated by its ability to provide high diffraction efficiencies and optical clarity, major factors for applications of interest herein. Dichromated gelatin can also record closely spaced fringe patterns, providing high resolution capability. Photopolymers also have high diffraction efficiencies but, at present, have limited commercial availability. Thermoplastics have the property of being repeatedly exposed and reused as a holographic recording material. It is not readily apparent that this feature is important for the technologies described herein. The spatial frequency response of thermoplastics, although high, is not as uniform as that for photographic films and dichromated gelatin materials. The main advantage of a photochromic material is its rapid response to the exposing laser irradiation. Furthermore, no development or processing is needed. These materials have a relatively low efficiency and are not commercially available. Finally, photoresists are of general interest when a reflective holographic optical element is desired.

An effective way to clearly determine the presence of laser light after transmission through a scattering medium is to use a holographic lens made with a large angle separation between the exposing reference and object beams. Beam angle separation influences the recorded interference fringe pattern on the holographic lens, and specifically the fringe separation is a function of the relative beam angle and laser wavelength.

Figure 3:
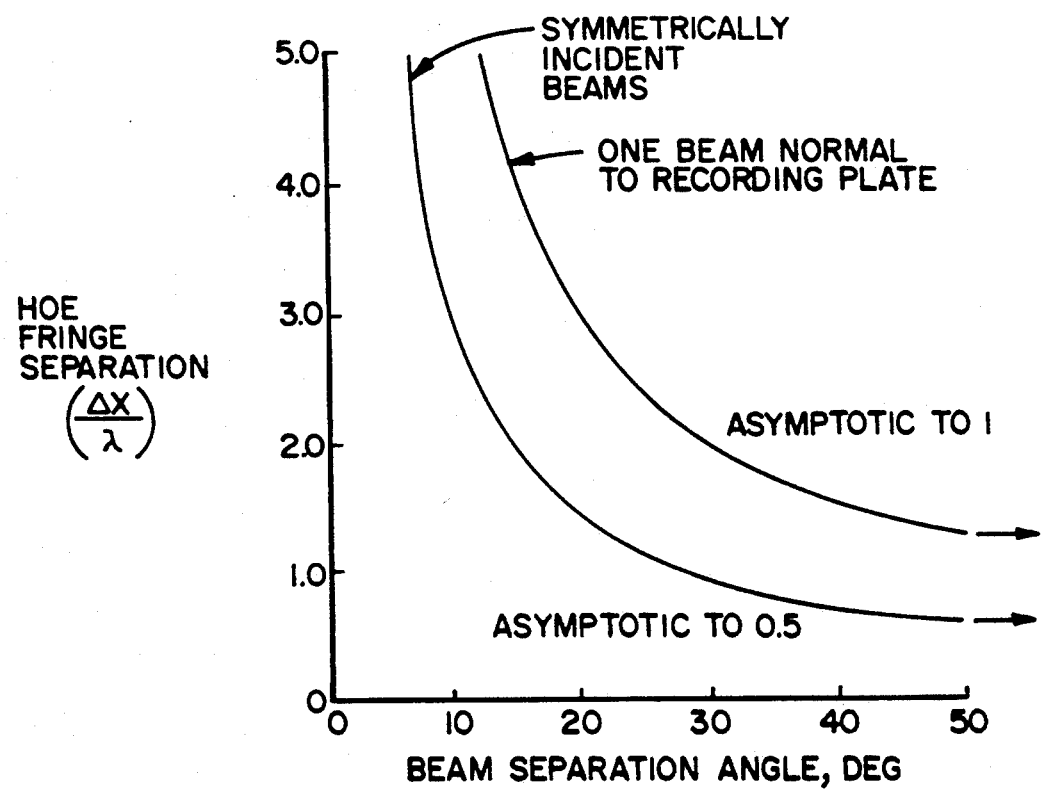
FIG. 3 shows how the fringe period (in wavelength units) of a holographic optical element varies with relative beam angle over a practical region of interest, derived from the interference pattern of two plane waves.

FIG. 3 shows how the fringe period (in wavelength units) varies with relative beam angle over a practical region of interest. In FIG. 3 the acronym HOE refers to a holographic optical element. These results are derived from the interference pattern of two plane waves. If $\theta_R$ and $\theta_S$ are the incident angles of the collimated reference and signal beams, respectively, $\Delta x$ is the fringe spacing and $\lambda$ is the wavelength, then the fringe separation is given by $$(\Delta x/\lambda) = (\sin \theta_R - \sin \theta_S)^{-1}$$

Two cases are presented, one in which one beam is normal to the photographic plate, and one in which both beams are symmetrically oriented about the normal to the plate. In general, as the angle between beams is increased, the fringe separation decreases. The ability of the recording medium to respond to small fringe periods (e.g., molecular migration separation) affects the efficiency of the holographic optical element. Consequently, high resolution recording materials must be used for a holographic lens fabricated at large beam angle spacing.

Note that the fringe pattern of a holographic lens has a varying fringe spacing that can be thought of as a high frequency "chirp" modulation of a carrier fringe frequency, and this modulation characteristic enables the holographic lens and multiple holographic lens to focus the reconstructed beams. The more complicated, very fine detail of the interference fringe pattern of the multiple holographic lens dictates that only materials capable of responding to a very high spatial frequency patterns could be used.

It is likely that in some applications a holographic optical element will be used at a wavelength that differs from the wavelength used to make the holographic optical element. In this case, the angle through which the holographic optical element will redirect an incident beam is different from the angle used to construct the holographic optical element. If the ratio of reconstruction (operational or playback) wavelength/construction wavelength is called $\mu$, then, for a plane wave beam incident normal to the holographic optical element plate, the emerging plane wave beams appear at an operational angle given by $$\sin \theta_P = \mu(\sin \theta_R - \sin \theta_S).$$

Figure 4:
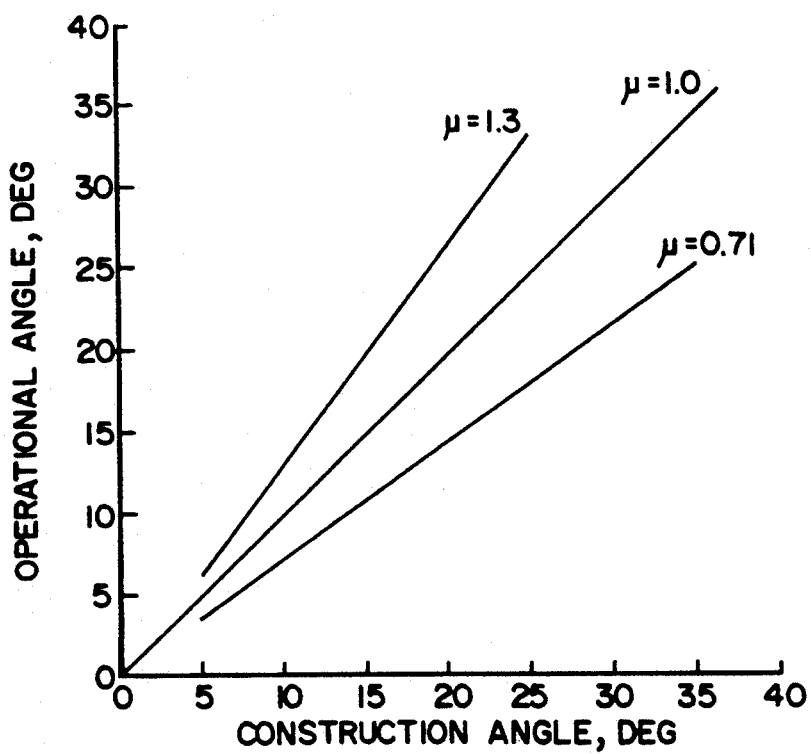
FIG. 4 illustrates the relationship for when a plane wave beam is incident normal to a holographic optical element plate, and the emerging plane wave beams appear at an operational angle as shown for three values of $\mu$, wherein $\mu$ is the ratio of the reconstruction (operational or playback) wavelength to the construction wavelength.

FIG. 4 illustrates this relation for three values of $\mu$, assuming $\theta_S = 0$. It is this characteristic which enables the wavelength of the incoming radiation to be determined.

The holographic optical element can be recorded in thin or thick media. The former, for example, would exhibit little sensitivity in its output when it is rotated about an axis in its plane and oblique to the plane of the beams forming the hologram. As the thickness of the hologram increases, its sensitivity to rotation and specific wavelengths increases, but generally its throughput efficiency increases also. Various media can be used to record these holograms such as silver halide, bleached silver halide, photopolymer, electropolymers, or thermopolymers and dichromated gelatin. Each has their virtues but dichromated gelatin is often preferred because of its low scattering and high optical transmission.

The thickness and refractive index of the recording medium influence the angular distribution of light transmitted through a holographic optical element. A figure of merit that combines significant factors in describing the diffracted light pattern transmitted through the hologram is the thickness criteria or Q-value, $$Q = 2\pi\lambda t/(n_o d^2)$$

where
$\lambda$ = wavelength,
$t$ = medium thickness,
$n_o$ = medium refractive index, and
$d$ = fringe spacing.

Figure 5:
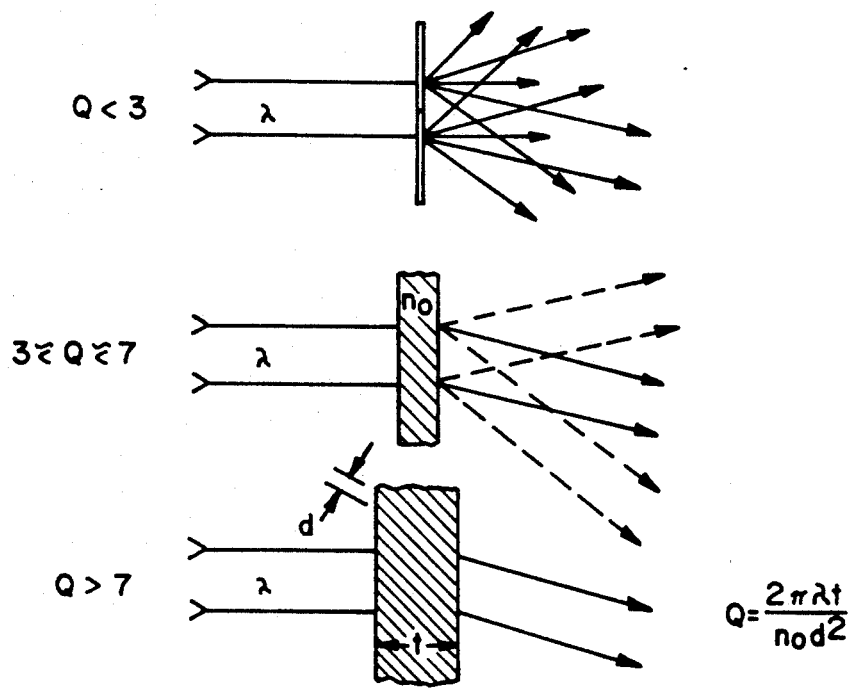
FIG. 5 schematically shows differences in the transmitted light distribution due to diffraction for three figure of merit ranges, termed Q-values.

FIG. 5 schematically shows differences in the transmitted light distribution due to diffraction for three Q-value ranges. For large Q (e.g., thick emulsions), the diffraction efficiency of the hologram can be very high for a specific wavelength. However, a high efficiency could be achieved only over a very narrow range of incident angles for the reconstruction beam (a Bragg effect). A large Q medium is also the most sensitive to a specific wavelength.

Figure 6:
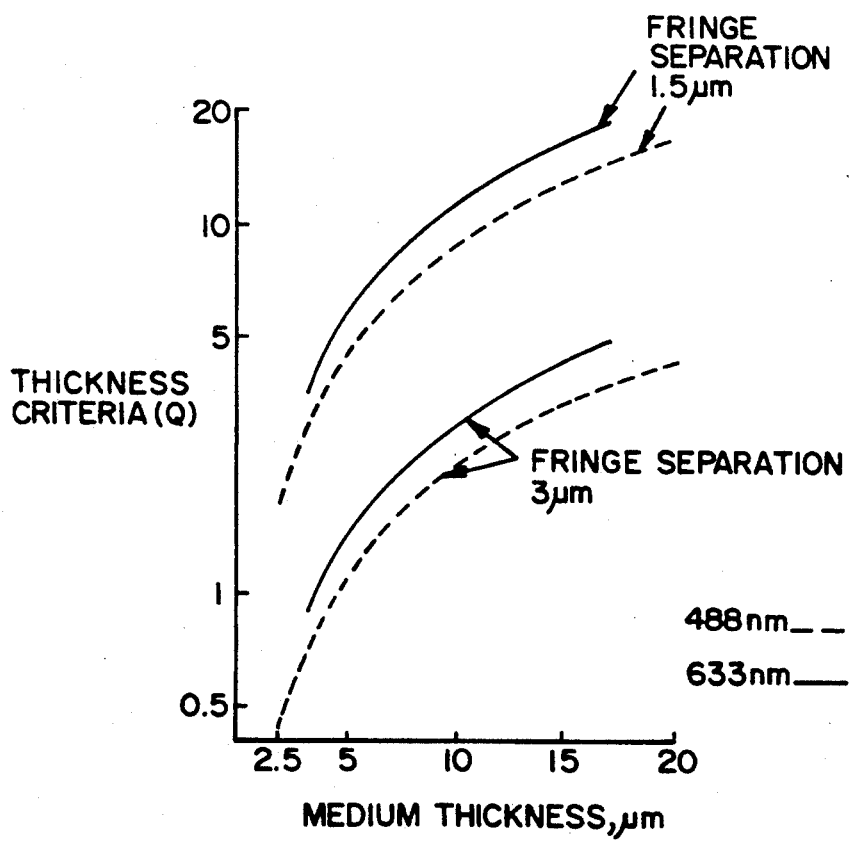
FIG. 6 illustrates quantitatively the variation of Q with medium thickness for two laser wavelengths and for values of fringe spacing, as determined by the angle between plane wave reference and object beams.

FIG. 6 quantitatively illustrates the variation of Q with medium thickness for two laser wavelengths and for values of fringe spacing, as determined by the angle between reference and object beams. FIG. 6 shows that a wide range of Q-values is available with proper choice of emulsion and of wavelength.

FIG. 1 illustrates a basic scenario to be addressed by the coherent radiation detection system of the present invention in which a laser 10a generally present in a region 11a emits a beam in the vicinity of a receiving system 12. A direct line between the laser and the receiver is not necessary as shown in the additional laser location 10b and reflecting surface 11b. The purpose of the receiving detector of the present invention is to detect the illumination of the receiver with coherent radiation, enable its wavelength and angle of incidence to be determined and recorded, and also to attenuate the beam if necessary. One embodiment of the receiver as illustrated in FIG. 1 includes an imaging camera 13 preceded by a holographic optical element beam modifier 14 and a beam attenuator 15. The output of the imaging camera 13 is fed to a monitor 16 and recorder 17. The beam attenuator 15 is an optical filter which limits the beam intensity, if necessary. The degree of attenuation is established after a fast detector 13a rapidly measures the incident radiation 19, sends a signal to an amplifier and driver 18 which drives a stepper motor or similar device 19 to cause the beam attenuator 15 to be changed to a predetermined value. The beam attenuator 15 could have a linear translation drive to arrive at the optimum attenuation, or if the attenuator is a disk, it could also be tapered or stepped, and achieve appropriate attenuation by a driven rotation.

It is not desirable to use the iris diaphragm typically supplied with a TV camera lens to regulate the light level into the camera since this action might adversely affect the outer regions of the field of view and/or block some laser light from entering at large angles.

The camera 13 might be a standard vidicon type such as an RCA 2000, or a CCD type like the Sony XC-37 miniature camera. The former is preferred if size is not a restriction because the two have comparable sensitivity and resolution, but the former is not subject to vertical pixel saturation which causes vertical lines to form under intense incident radiation, as in CCD types of cameras. One function of the beam attenuator 15 is to limit the beam intensity such that vertical pixel saturation does not occur when CCD cameras are used as the detector.

Recently a new CCD camera has become commercially available, the VIDEK an Eastman-Kodak Company) "Megaplus" camera which is especially useful for high resolution applications. The detector has a 1320 pixel by 1035 pixel format. Consequently, its 8.98 mm by 7.04 mm active area size gives it a resolution of 73.5 cycles per mm by 7.35 cycles per mm significantly exceeding other detectors. This resolution provides the present invention with:

(a) a greater wavelength determination resolution;
(b) greater image resolution for the target of interest than is otherwise obtainable from the other detectors;
(c) provides a greater resolution for the unique holographic optical element patterns that can be made available;
(d) 100% fill since this detector has essentially no space between the pixels;
(e) increased accuracy because the detector has square pixels, and this avoids the less discriminating detection of rectangular pixel arrays;
(f) digital output (and thus one less operation, i.e., a digitizer);
(g) 10 millisecond exposure time;
(h) 450 to 975 nanometers wavelength response at the 10% quantum efficiency level; and
(i) a greater resolution in the direction of arrival determination.

One embodiment of the present invention adds a properly designed holographic optical element to an instant camera such as a Polaroid camera. This embodiment represents an economical way to provide a user such as a pilot with an easy to use and cheap detector to record a scene or incident laser radiation in an open skies scenario. Modifications to the camera may be desired to provide continuous and time overlapping coverage. This may not be a severe demand as a pass over hostile surface platforms might last for short periods, periods within the camera exposure capability.

Moreover, cameras other than the instant variety can be used, such as, for example, standard 35 mm or larger format Hasselblad types. A holographic optical element can be used with a standard 35 mm type of camera to provide a relatively cheap laser illumination detector. It should be understood that in any specific application of the holographic optical element laser illumination detection system, the holographic optical element would be explicitly designed in view of the camera optics parameters. Also, the calibration and subsequent wavelength determination and angle of arrival features would be designed in accordance with the camera design parameters and choice of recording films.

In an alternative embodiment with a standard camera, a sensor is mounted adjacent to the lens with an appropriate lens configuration to capture an illuminating laser beam. A detector such as an EGG SGD-100 or equivalent is used, which has a rise time of 5 nanoseconds and six orders of magnitude operational capability, and in addition, readily operates its circuit from a battery power supply. The detector, upon sensing a signal, causes the camera to operate, perhaps to the same extent the camera shutter control operates in response to an incoming signal under normal camera operation. Thus, much of the existing camera electronics could be replaced with a high speed detection and shutter drive control, thereby keeping the basic configuration and providing a low cost.

The monitor 16 and recorder 17 are standard types of equipment. A microprocessor 20 receives the video output from the camera or monitor for storage and processing. The function of the processor is to determine peak signals in the received video and compute the difference in the signals. This data is then compared to stored (a priori) information which establishes a relationship between spacing and wavelength. When determined, the identified wavelength value is displayed in some form such as a digital reading which can be superimposed upon the frame.

Figure 1A:
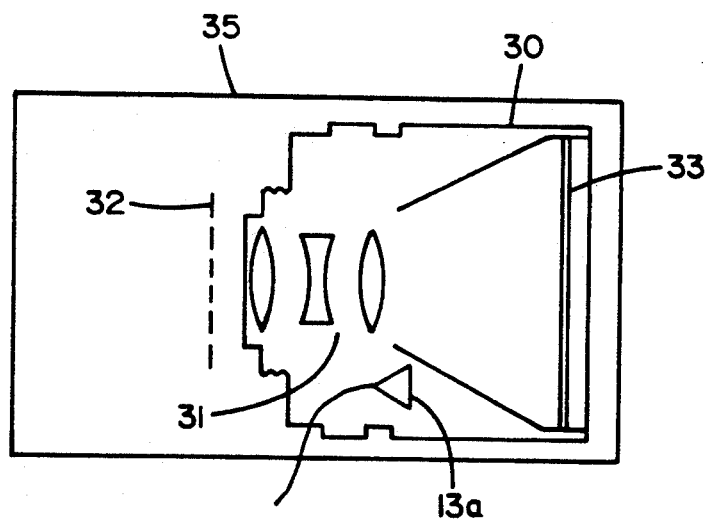
FIG. 1A illustrates an outline including lenses and focal plane of a typical video camera lens system with an added multiple holographic lens component.

FIG. 1A illustrates a full scale outline 30, lenses 31 and focal plane 32 of a typical video camera lens system within a camera body 35. Although possibly detached as in FIG. 1, the holographic optical element beam modifier 33 can be incorporated into the lens assembly as shown in FIG. 1A. If warranted, the small high speed diode 13a might also be included, and compactness for the sensor may be a significant aspect of the installation. Note that the active area of a TV camera is typically rectangular in shape (e.g., 6×8 mm), whereas the projected image is circular. Thus portions of the incoming light pattern will overfill the active area and be lost in the detection procedure. As described hereinbelow, this heretofor wasted region can be used for wavelength determination.

Referring to FIG. 1, when the beam modifier 14 is a holographic lens and radiation from a laser 10a or 10b is incident upon the system 12, the image seen by the camera will be that in the field of view. In addition, the incident radiation will be diffracted so that the angle of diffraction $$\theta_d = \sin^{-1}\left[\frac{m\lambda}{b} \pm \sin\theta_i\right]$$

when the radiation is along the system boresight ($\theta_i=0$)

$$\theta_d = \sin^{-1}\left[\frac{m\lambda}{b}\right]$$

wherein m is the order of diffraction, $\lambda$ is the wavelength in mm of the incident radiation and b is the grating pitch in mm. The $-/+$ is determined by whether the incident radiation is on the same/different side of the grating normal as the diffracted beam. At the image (recording) plane the first orders will be separated $$\Delta s = \rho\theta_d$$
$$= \rho \sin^{-1}\left[\frac{\lambda}{b}\right].$$

$\rho$ is the effective radius accounting for the effective focal length from the holographic optical element to the recording plane. This includes the holographic optical element and camera lens characteristics. Note that once the wavelength has been determined, the boresight angle, $\theta_i$, could then be obtained from the location and/or separation of the diffracted orders.

Figure 8:
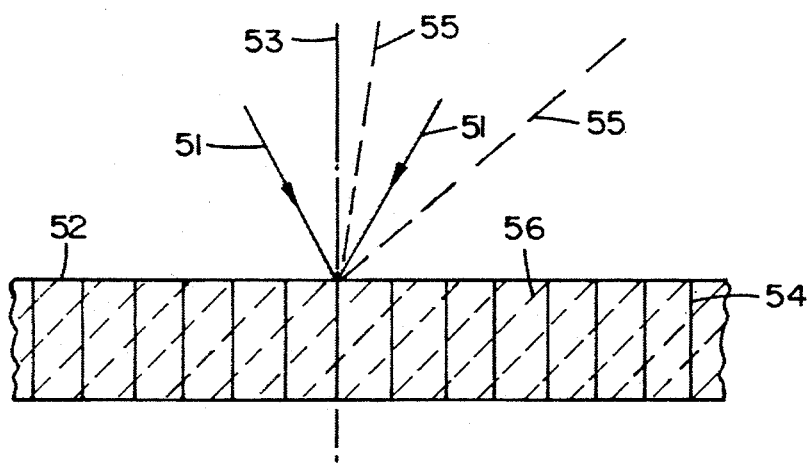
FIG. 8 illustrates one wavelength identification embodiment of the present invention, based upon the principle that fringe patterns established by two collimated construction beams can be made to vary in fringe separation and fringe plane angle by varying the angle between the two beams.

Consider FIG. 8 which illustrates one wavelength identification embodiment of the present invention. The principle behind this design is that fringe patterns established by two collimated beams can be made to vary in fringe separation and fringe plane angle by varying the angle between the two beams. If the beams 51 are uniformly incident upon a recording plate 52 with regard to the plate normal 53, the fringe planes 54 formed in the recording medium will be uniformly perpendicular to the plate. It is assumed that the characteristics of the situation satisfy the Q requirement:

$$Q = \frac{2\pi\lambda t}{n_o d^2}$$

where $\lambda$, t are the wavelength and emulsion thicknesses respectively for the medium having an index of refraction $n_o$ and in which the fringes are recorded at a spacing of d. Experience has shown that generally, the following holds:
$Q \lesssim 3$ gives thin media
$Q \gtrsim 7$ gives thick media
$3 \lesssim Q \lesssim 7$ gives media with characteristics between thick and thin.

Obviously, the effective medium length for fringe planes depends upon their angle with respect to the medium surface. Consider now two beams 55 at angles that are unequal with respect to the normal. The fringe planes 54, 56 formed by these beams will be at some angle not normal to the medium surface. When the medium meets the requirements for Q as given above, it means that only one wavelength $\lambda_1$ will be re-enforced by the first set of fringes and another wavelength $\lambda_2$ by the other fringe set. It can be arranged that $\lambda_1$ will not be re-enforced by the fringes for $\lambda_2$ and vice versa. Moreover, the fringes for each wavelength should not be in the same direction, e.g., parallel at the medium surface.

Figure 9:
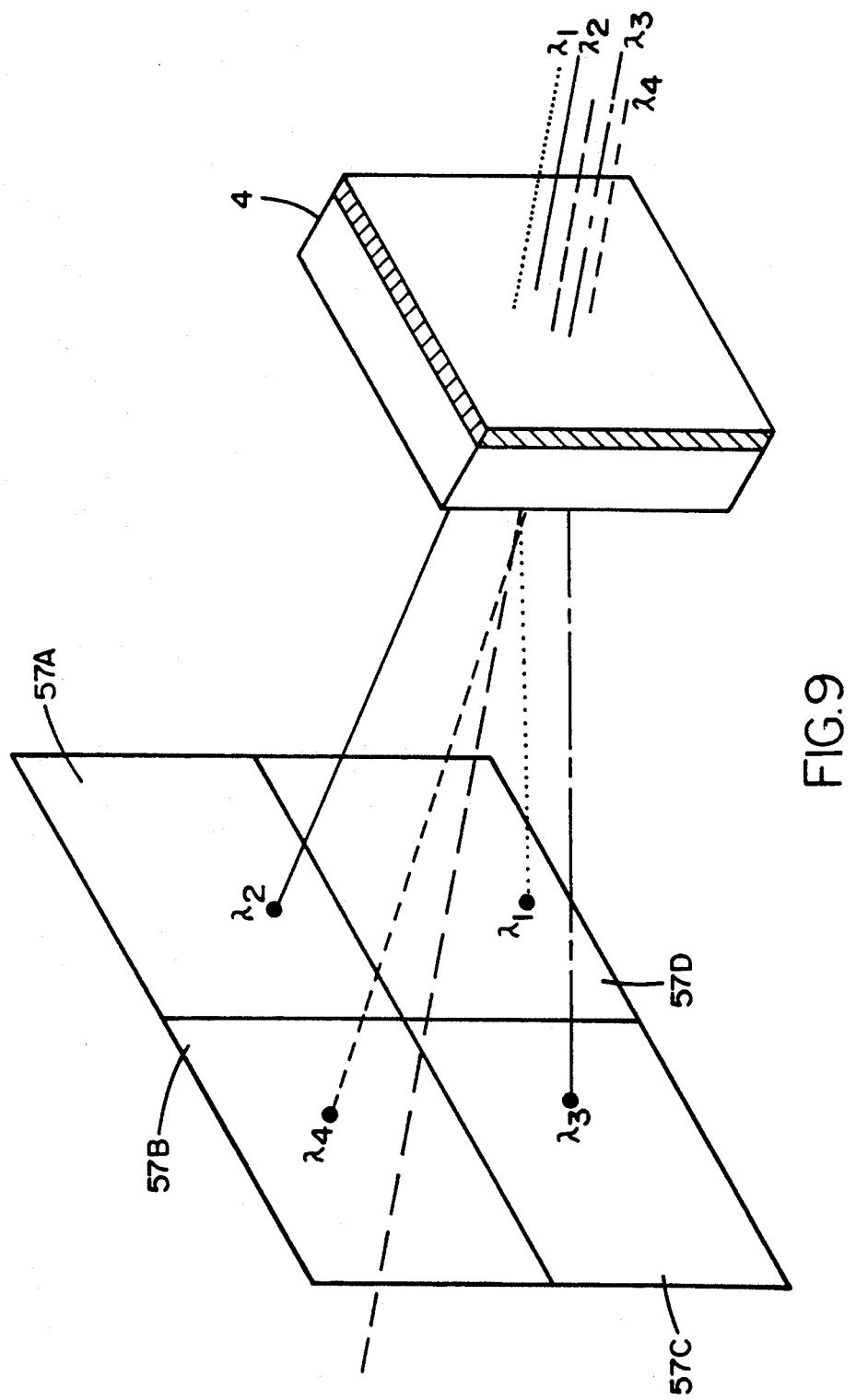
FIG. 9 illustrates an embodiment based upon an extension of the principle of FIG. 8 to accommodate four wavelengths, $\lambda_1$, $\lambda_2$, $\lambda_3$, and $\lambda_4$ with a set of fringe planes for each wherein when four wavelengths are incident upon this specially designed holographic optical element, then each of the four wavelengths is directed to one of the four quadrants.

Furthermore, many such fringe plane systems can be set up, one for each wavelength. Thus, we have a wavelength selector. Suppose we accommodate four wavelengths, $\lambda_1$, $\lambda_2$, $\lambda_3$, and $\lambda_4$ with a set of fringe planes for each. We can then, for example set up the situation of FIG. 9 where when four wavelengths are incident upon this specially designed holographic optical element 4, then each of the four wavelengths is directed to one of the four quadrants 57A–D. The amount of crosstalk, i.e., $\lambda_1$ components with $\lambda_2$, etc., is typically $-40$ dB.

This specifically designed holographic optical element can employ gratings, holographic lenses or any other optical element discussed already, and applied as shown in the system of FIG. 1. For compactness the center of the detector quadrants would be used for the CCD input array or other device, and the holographic optical element would be placed against the TV camera lens (as in FIG. 1A) and used for purposes described above.

Figure 7:
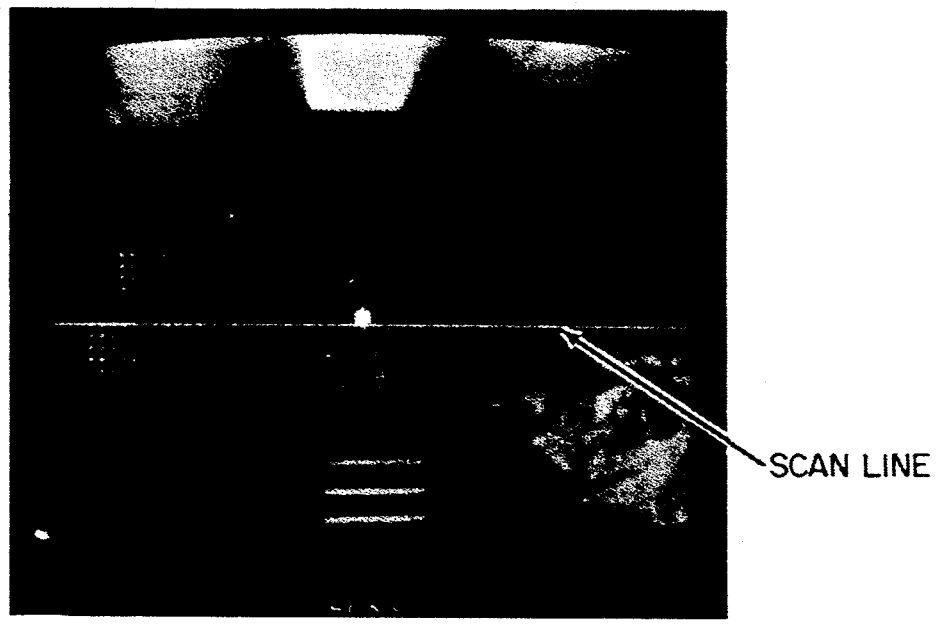
FIG. 7 shows the result displayed on a CRT screen when a particular multiple holographic lens consisting of 75 superimposed single holographic lenses is illuminated by a laser beam.

FIG. 7 shows the effect of using a multiple holograph lens, consisting of 75 superimposed single holographic lenses. The observed array of bright spots centered around the boresight axis is a characteristic of laser illumination, not of incoherent light. Furthermore, the separation between spots is wavelength dependent, and could be used to determine wavelength. The two first orders of this holographic optical element are still within the camera's field of view. (They can be brought closer to the center boresight axis by decreasing the signal-to-reference beam angle when constructing the holographic optical element). Note that the angle separations of the two first order patterns and the DC or inline pattern are also wavelength dependent. When a noncoherent source was used for illumination (a bright tensor lamp in this case), the characteristic spot array was greatly attenuated, distorted or not present at all in certain regions.

Several special features for augmenting an optical system with an HOE are described below. Operational Mode Selectivity The description with regard to FIG. 5 and the wavelength determination by using thick holographic optical element has a counterpoint to it and it is that for the system to be most effective, incoming radiation should be paraxial. This suggests that perhaps there should be various modes of operation, i.e., search mode, wavelength determination mode and perhaps others.

Figure 11:
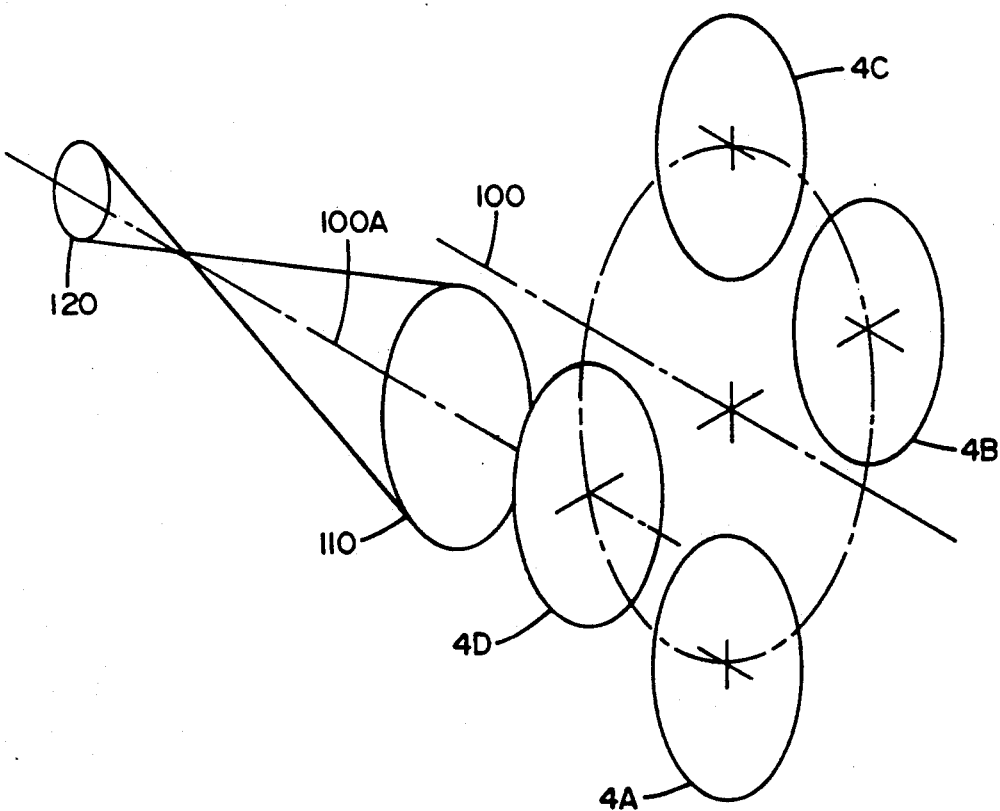
FIG. 11 illustrates an embodiment of the present invention wherein four different holographic optical elements are mounted in a turret arrangement and wherein any one of the four elements can be selectively rotated into a position of use.

In order to achieve this, i.e., many modes, it is necessary for the holographic optical element to have many simultaneous characteristics which are often inconsistent or diametrically opposed. For example, the holographic optical element cannot be simultaneously thick and thin with their concommitent responses. Such limitations are readily overcome by a "turret like" assembly holding various individual holographic optical elements, all different. This variation of the present invention is shown in FIG. 11. A series of four holographic optical elements 4A–4D are located about an axis 100 which is parallel to the camera lens axis 100A. The camera optics are represented schematically by 110, 120. The desired holographic optical element can be manually or automatically driven to a position in front of the camera lens. Thus, operational modes can be selected according to the mission. This concept is not limited to just four individual holographic optical elements and can include any suitable number thereof.

Extending the Field of View

Figure 10:
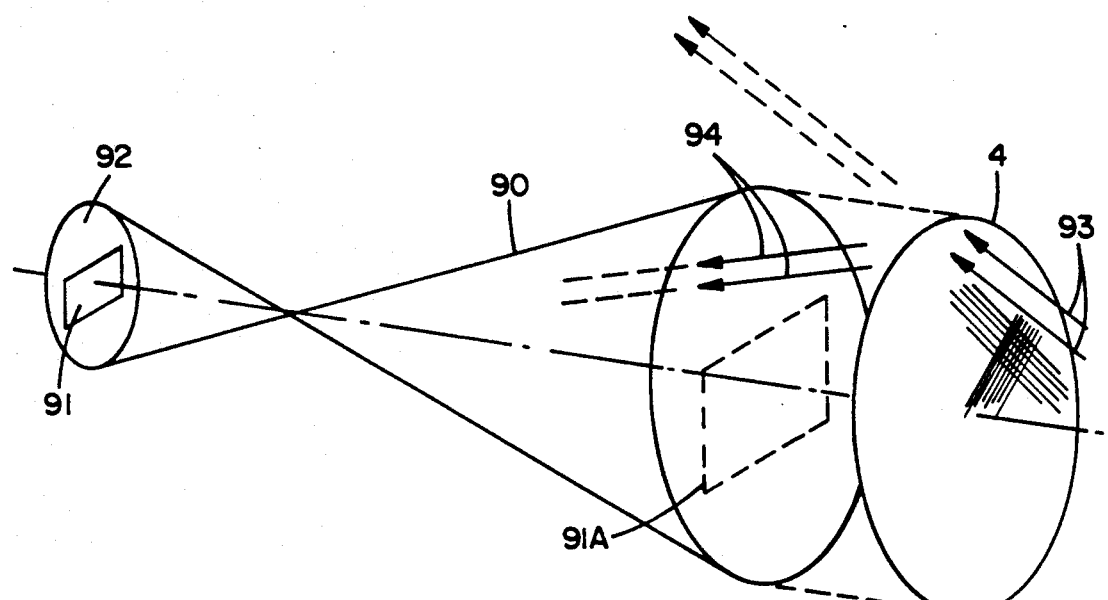
FIG. 10 is a sketch to illustrate how the incident beam acceptance angle of an optical system can be expanded by a properly designed holographic optical element for a detection mode of operation.

FIG. 10 is a sketch to illustrate how the laser acceptance angle can be extended even beyond that for the camera field of view. The camera field of view is defined as shown by the sensing element 91 even though the imaged area extends beyond it to a generally, circular area 92, located in the same plane as the sensing area. Area 92 is usually determined by the size and location of apertures in the camera system.

Radiation 93 is incident from the right. The double cone 90 represents the video camera lens field projected upon the camera sensor 91 in the plane of the sensor, i.e., the focal plane. The sensor itself is typically a 6×8 or 7×9 mm pixel array with the usual TV aspect ratio. The sensor array is the useful region of the camera and is reduced by a few pixels around the edges. Its projection 91A back to the input can be seen to leave much of the upper and lower portions of the lens field of view unused; the left and right regions are also unused although less so.

With the incident laser radiation, the holographic optical element would probably be totally illuminated. However, if not, laser light might strike a part of the holographic optical element 4 but be out of the field of view of the pixel array 92. By nature of the holographic optical element, i.e., its ability to angularly diffract the light rays, such portions of radiation can strike the holographic optical element and be out of the line of sight of the field of view but be diffracted inward. The angles of diffraction of the HOE can be designed into the HOE. In this way diffracted light 94 is projected or imaged upon the sensor 91 and detected. The angularly diffracted light 94 although not an image forming component of the incident image, falls within the lens aperture stop and is transmitted toward the camera sensor 91, and forms a detectable spot of light in the camera field of view.

In effect, the diffracted laser light is similar to vignetting in a conventional lens imaging system. Thus, in essence the laser beam acceptance angle has been extended beyond the angular field of view of the sensor.

Frame Marker Unit

FIGS. 1 and 2 illustrate the presence of a high speed diode 13a (e.g., an EGG model SGD-100 with a 9 ns rise time), the purpose of which is to enable an attenuator 15 to be rapidly inserted in front of the camera lens when direct, high intensity light is incident thereon.

The role of this diode can be expanded to include:
a—light intensity control
b—frame marker, or
c—frame eliminator.

Figure 12:
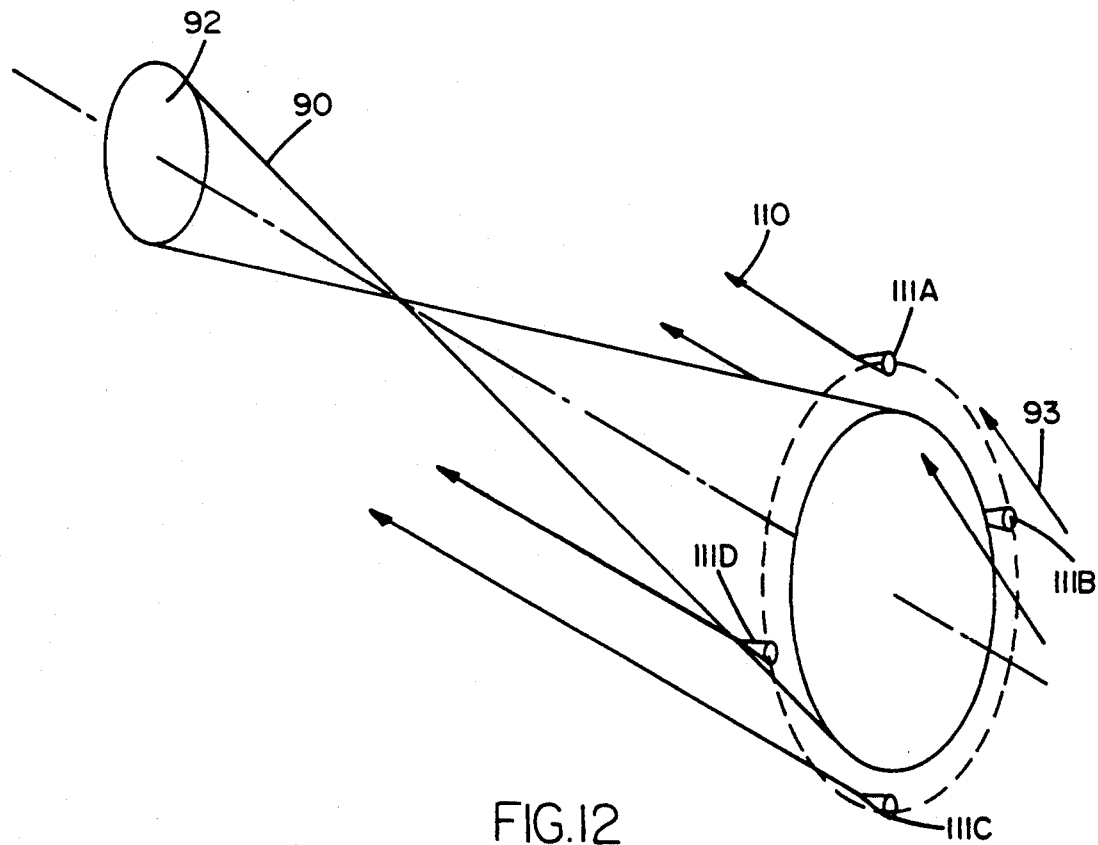
FIG. 12 shows one embodiment of the present invention wherein four diodes are distributed around a circular region close to the input of a camera field of view, and are used to mark particular frame(s) that contain a radiation signal.

As shown in FIG. 12, four diodes 111A-D are distributed around a circular region close to the input of the camera field of view 90. Radiation 93 incident at some angle would strike one or more of the diodes. Four diodes are shown in FIG. 12 but other, perhaps more optimum arrangements can be used.

Figure 13:
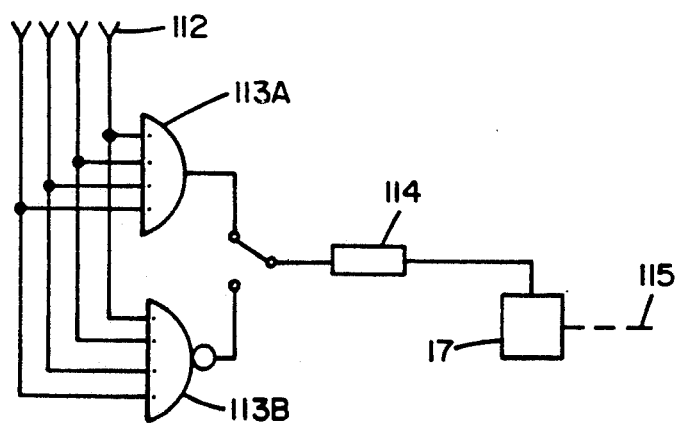
FIG. 13 illustrates a logic circuit for processing the outputs of the four diodes of FIG. 12.

FIG. 13 illustrates a representative logic circuit for processing the outputs of the four diodes of FIG. 12. Referring thereto, the outputs 112 of the diodes 111A-D are directed to the input of a gate assembly 113 where an AND gate 113A and NAND gate 113B are selectively located. A signal from any diode would trigger one of these. If the AND gate is selected, the microprocessor 114 would signal the recorder 17 to mark the particular frame(s) that contain a radiation signal. The NAND gate operating in conjunction with the microprocessor could eliminate all frames other than those which contain frames of interest. The items subsequent to the recorder 17 are indicated at 115 and are similar to those shown in FIG. 1. Also not shown are the essential adjuncts for the gates 113 which are items like the clock generator to provide timing for the diode amplifiers and frame rate, op amps to precede the gates, video interfaces for blanking or marking the frames, and similar electronic requirements. Also omitted is the use on a holographic optical element to discriminate incoming radiation for coherent, monochromatic types as in the previous descriptions. Such a holographic optical element would precede each of the diodes in FIG. 12 and probably be a single holographic lens whose focal length would be determined by the size of the diode sensitive area. The direction of the incoming radiation will dictate the focal plane movement which cannot exceed the size of the sensor surface within region 92. The focal length of the holographic element can be designed to meet this requirement.

Determination of Holographic Optical Element Focal Length

The focal length of the holographic optical element used in the present invention is not believed to be critical for proper operation provided it is typically very much greater than the CCD camera lens focal length. Consider a typical video camera lens such as a Comiscar 1:1.6, 16 mm two element lens which is representative of such lenses and not otherwise unique. It is assumed that the principal plane is in the center plane, a distance $e$ from the holographic optical element. The lens formula for two lenses (the holographic optical element and the Comiscar) is given by:

$$(1/fR) = (1/f1) + (1/f2) - (e/f1 \cdot f2)$$

where, for example, f1=16 mm, f2=holographic optical element focal length=400 mm, and $e = 20 + 25/2 = 32.5$ mm, the resultant focal length fR=16.7 mm. This shows that there is only a small deviation in focusing the laser beam itself from the sensor plane of the video camera. It also means that the scene which the camera views and the focused coherent radiation are in essentially the same plane. The radiation shows up in the sensor plane with a high Signal/Clutter ratio as desired. The focal spot can be used as a measure of wavelength in self-calibration as long as the focal point is established for the shortest wavelength to be encountered. What is to be avoided is to establish focus mid range. In this case there would be an indeterminacy, i.e., is the unknown wavelength longer or shorter? Thus the holographic optical element design is significant to this embodiment of the present invention.

For a holographic optical element the following relationship holds:

$$\text{SIN (recon angle)} = u \times \text{SIN (constr angle)}.$$

and $$F \text{ (recon)} = F \text{ (constr)}/u$$

where u is the wavelength ratio as defined hereinabove of $\lambda\text{recon}/\lambda\text{constr}$, and F is a focal length. In both equations $\lambda$ is wavelength, and recon, constr refer respectively to the holographic optical element reconstruction, construction angles. If as above, the shortest wavelength is assumed to be 4880 angstroms, then u can be computed for the wavelengths: 4880, 5145, 6328, 6470, 7800 and 8200 (commonly encountered wavelengths). If the focal length for the shortest wavelength is 400 mm, the focal points can be computed for the wavelengths above: 400, 370.4, 308.5, 301.7, 281.2, 252.5, and 238.1. For the shortest focal length, the effective focal length (camera lens with holographic optical element) can be computed and found to be 17.19 mm, 1.19 mm beyond the sensor plane. The spot size for the shortest wavelength can be computed from $d = 2.54 \times \text{lambda} \times (\text{focal length/beamsize})$ in consistent units, and found to be 0.83 umeters. Remembering that this point is at the focus of 16.7 mm, the approximate size on the sensor can be computed and found to be about 1.05 mm for a 25 mm input beam. For the shortest focal length holographic optical element this number is 1.73 mm. Since a typical CD camera has a resolution about 20 cycles/mm, it can be seen that the size of the spot might be determined within about 5%. The closest two wavelengths given above are within 2.25% so some ambiguity can arise between 6328 and 6470 but otherwise, wavelength determination also appears feasable by spot size measurement. Similar computations can be made for cameras of increased resolution and subsequent accuracy in wavelength and angle of arrival can be determined.

Integrated Holographic Optical Elements

Figure 14:
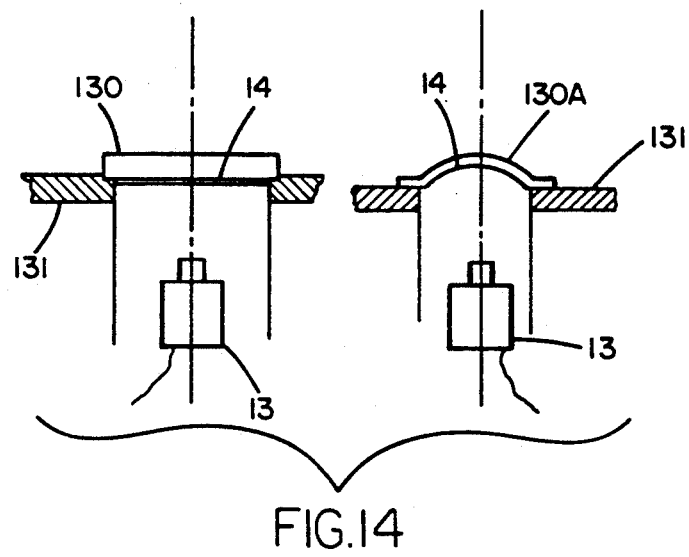
FIG. 14 illustrates two embodiments of the subject invention in which the holographic optical element is incorporated as part of the structure of a sealing window of a vehicle.

The holographic optical elements do not have to be selfstanding additions to the system. FIG. 14 illustrates two embodiments of the subject invention in which the holographic optical element 14 is incorporated as part of the structure of the object upon which it is to operate. The sealing window of a system inside a vehicle can be the base for the holographic optical element 14. The window 130 is mounted on the vehicle envelope 131 with the video camera 13 in this case, mounted inside of the housing within the vehicle 132. In one embodiment in the illustration the window is flat (left) and in the other, case (right), the window 130A is curved. In the latter case, the window could be designed so that it forms a holographic focussing element. In both cases, the holographic optical element 14 is constructed immediately upon the window. It could also be attached as a separate component. Special preparations would have to be made for direct construction of the holographic optical element on the window, but such processes are within the state of the art.

In both cases the attachment and sealing details will depend upon the host vehicle and its environment. It would be expected that all of the details previously discussed hereinabove would be part of the system design entity when the windows of FIG. 14 are incorporated in the system.

Signal Present Reference Channel

In FIGS. 1 and 1A a high speed detector 16 was shown and it was stated in reference thereto that the high speed (approx. 5 ns.) response of the detector would enable one to either mark or eliminate all but frames of interest.

Figure 15:
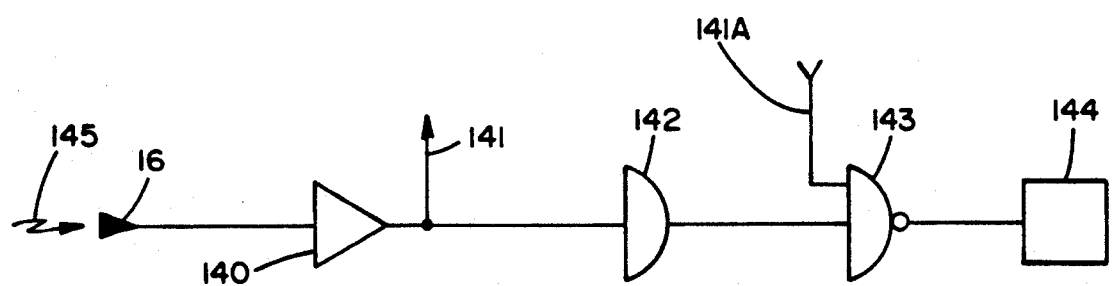
FIG. 15 illustrates a basic circuit for the high speed detector, referred to as the Signal Present Reference Channel, the output of which is directed to either a frame control circuit or to an indicator/display unit, or both.

FIG. 15 illustrates a basic circuit for the high speed detector, now referred to as the Signal Present Reference Channel. Radiation 145 incident upon the detector 16 (and any preceding optics) is fed to an operational amplifier 140. The output 141 is fed to an oscillator/timing circuit wherein an incoming pulse is synchronized to a basic system clock pulse. The op amp signal 141 is also fed to a buffer 142 and finally to a NAND gate 143 to which the processed clock/input signal 141A is also directed. Under the correct conditions, there is an output which is fed in turn to either a frame control circuit (as in FIG. 1) or to an indicator/display unit, or to both.

The Reference Channel can be an independent channel in that it accepts a signal without being involved in the image, signal or wavelength determination. It can also be used to analyze the incoming signal for its pulse/cw wave characteristics.

Input Laser Beam Redirection

It would be desirable to enable a wide acceptance angle of incoming laser radiation to be reduced to be more acceptable to the holographic optical element. One reason for this is that the holographic optical element as described hereinabove is more efficient when the incidence angle is reduced. Wavelength sensitivity is also increased.

Figure 16:
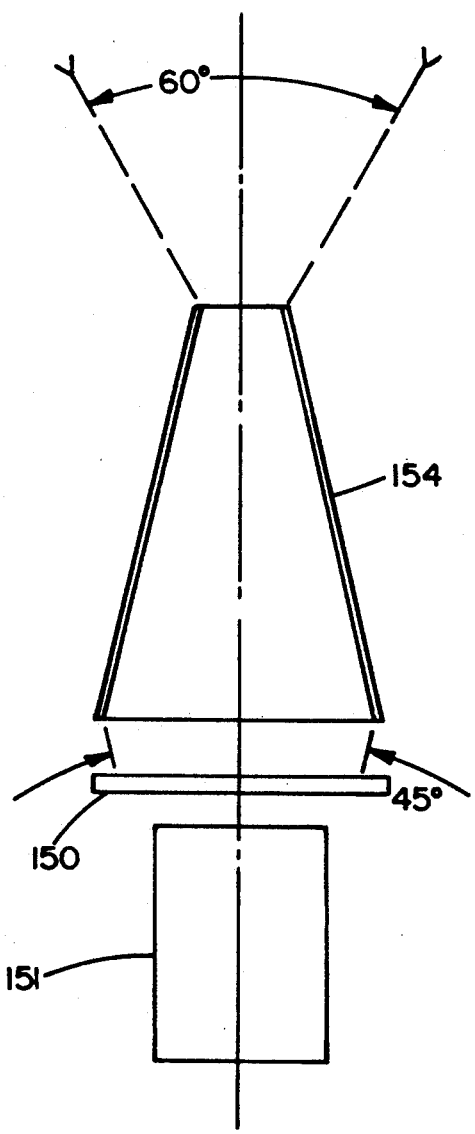
FIG. 16 illustrates an embodiment in which the addition of an internally reflecting coneshaped reflector enables a wide field of view to be reduced in angular magnitude, the amount depending upon the cone angle, the opening size and the height of the cone in terms of the opening.

FIG. 16 illustrates an embodiment in which the holographic optical element 150 and the detector 151 (similar to that in FIG. 1) are in the usual alignment. The addition of an internally reflecting coneshaped reflector 154 enables a wide angle input to be reduced in angular magnitude, the amount depending upon the cone angle, the opening size and the height of the cone relative to the size of the opening.

Figure 17:
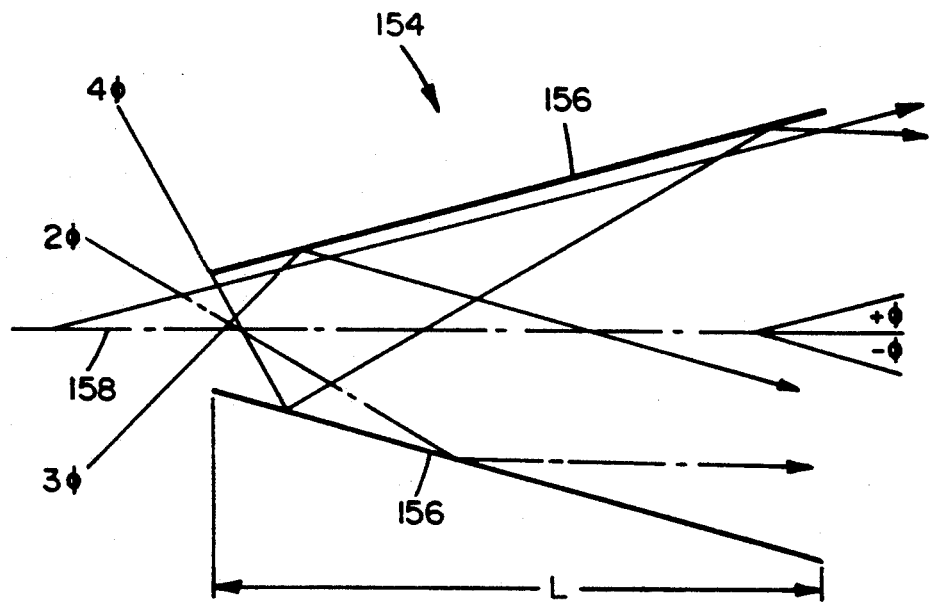
FIG. 17 illustrates a specific example of the embodiment of FIG. 16 case for a 60 degree incident light total angle, a cone angle of 15 degrees and a height $H=6.67$ d, d being the opening, 30 mm in the example.

The optical device 154 of FIGS. 16 and 17 enables the input angles of incoming radiation to be narrowed to a smaller set of angles. The purpose of this function is to optimize input conditions for a holographic optical element (HOE), a detector or some following element requiring a narrow field of view. The optical device 154 has a truncated conical configuration with laser radiation incident from the narrow end as shown in FIGS. 16 and 17. As illustrated in the diagram of FIG. 17, two opposed conical reflecting surfaces 156 are located facing each other with a prescribed angle $\phi$, measured with respect to the indicated central axis 158. Laser radiation is incident from the left at arbitrary angles which for convenience are labeled in terms of $\phi$, namely inputs labeled $\phi$, $2\phi$, $3\phi$, $4\phi$, etc., with the output angles also being designated therein. As the incident angles which are a multiple of $\phi$ are traced with reflections through the conical element 154, the output angles never exceed $+/-\emptyset$ provided that the axial length L of the conical element 154 is long enough. It should be noted that the length L of the conical element 154 can be determined by the expected or desired range of input angles. Also, the input aperture of the conical arrangement is determined or set according to input aperture requirements established by the overall usage of the angle reducer and its associated detector, HOE, etc. If the length L were greater, larger incident angles could be accommodated. Eventually a compromise must be reached between the input angle, angle reduction, cone length L, and reflection losses which, on multiple reflections, are cumulative.

A series of tests have been carried out to illustrate the effectiveness of a holographic optical element even when the laser illumination is scattered by a particle suspension that distorts the directed beam distribution prior to illumination of the holographic optical element, and indicated very positive test results.

Figure 18:
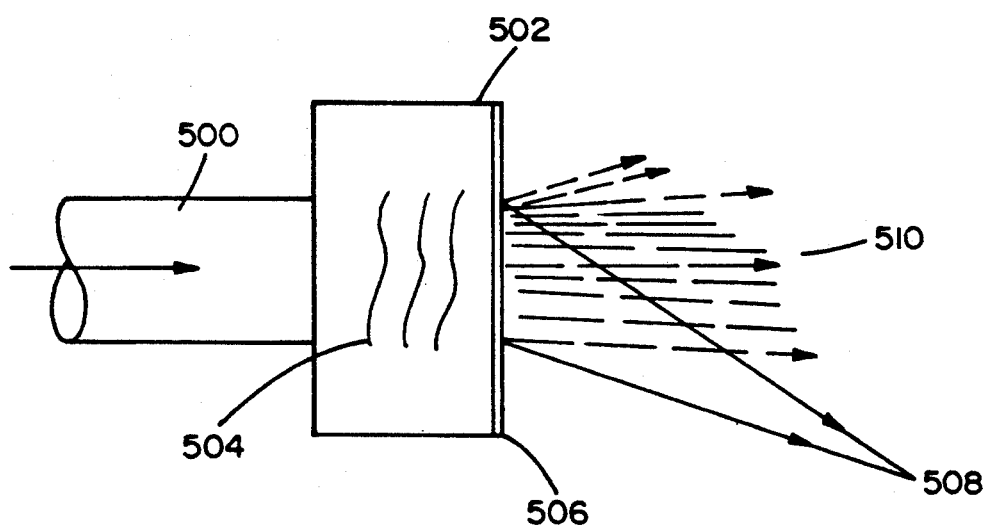
FIG. 18 shows an arrangement wherein a laser beam passes through a scattering medium and is then incident upon a holographic lens.

In FIG. 18, a laser beam 500 is incident upon a body of water 502 containing a scattering medium such as a very high concentration of magnesium hydroxide and aluminum hydroxide particles in suspension 504. The beam is scattered on passage through the volume of suspended material. A single holographic lens 506 with no other optical components is then used to focus some of the scattered light off to one side 508 of the original direction of the incident beam. In doing so, the focused beam 508 is well separated from the intense forward directed and small angle scattered light 510. Thus the focused spot could be easily detected without competition from the intense forward directed and small angle scattered light 510.

While several embodiments and variations of the present invention for a passive coherent radiation detection system are described in detail herein, it should be apparent that the disclosure and teachings of the present invention will suggest many alternative designs to those skilled in the art.

What is claimed is:

1. An optical system for detecting coherent radiation present in input radiation while discriminating against noncoherent radiation present therein, and for determining characteristics of the coherent radiation, comprising:
   a. a holographic optical element for receiving the input radiation and for focusing coherent radiation therein to a spot or array of spots at an output plane while discriminating against and not focusing noncoherent radiation therein, said holographic optical element being a hologram recorded on a recording medium which, upon being illuminated with coherent radiation, replicates the wavefront used to originally expose the record medium;
   b. a radiation detector positioned in said output plane for detecting the spot or array of spots.

2. A receiving detector for detecting coherent radiation in input radiation while discriminating against noncoherent radiation therein, as in claim 1, wherein said holographic optical element comprises a single holographic lens for focusing a single source of coherent radiation to a spot in said output plane.

3. A receiving detector for detecting coherent radiation in input radiation while discriminating against noncoherent radiation therein, as in claim 1, said holographic optical element comprising a multiple holographic element.

4. A receiving detector for detecting coherent radiation present in input radiation while discriminating against noncoherent radiation present therein, as in claim 1, wherein said holographic optical element comprises a multiple holographic lens for focusing a single source of coherent radiation to an array of spots in said output plane.

5. A receiving detector for detecting coherent radiation present in input radiation while discriminating against noncoherent radiation present therein, as in claim 4, wherein said multiple holographic lens directs wavelengths $\lambda 1$ to $\lambda n$ to different sectors 1 to n of said radiation detector to enable the presence of any one of wavelengths $\lambda 1$ to $\lambda n$ to be detected.

6. A receiving detector for detecting coherent radiation present in input radiation while discriminating against noncoherent radiation present therein, as in claim 1, wherein said radiation detector comprises a television camera.

7. A receiving detector for detecting coherent radiation present in input radiation while discriminating against noncoherent radiation present therein, as in claim 6, wherein said television camera includes a CCD detector.

8. A receiving detector for detecting coherent radiation present in input radiation while discriminating against noncoherent radiation present therein, as in claim 6, including a fast detector positioned outside of the field of view of the detector of said television detector, and the output of said fast detector driving an aperture attenuator to attenuate bright coherent radiation to prevent pixel saturation of the television camera by the bright coherent radiation.

9. A receiving detector for detecting coherent radiation present in input radiation while discriminating against noncoherent radiation present therein, as in claim 8, including a frame marker circuit coupled to the output of said fast detector.

10. A receiving detector for detecting coherent radiation present in input radiation while discriminating against noncoherent radiation present therein, as in claim 8, including a signal present reference channel for analyzing the output of said fast detector.

11. A receiving detector for detecting coherent radiation present in input radiation while discriminating against noncoherent radiation present therein, as in claim 1, wherein said radiation detector comprises a film camera.

12. A receiving detector for detecting coherent radiation present in input radiation while discriminating against noncoherent radiation present therein, as in claim 1, wherein said film camera includes an instant print film camera.

13. A receiving detector for detecting coherent radiation present in input radiation while discriminating against noncoherent radiation present therein, as in claim 6, including a recorder for recording the video signals of said television camera.

14. A receiving detector for detecting coherent radiation present in input radiation while discriminating against noncoherent radiation present therein, as in claim 1, including a field of view expander comprising a truncated cone having an internal mirror surface to expand the field of view of said radiation detector.

15. A receiving detector for detecting coherent radiation present in input radiation while discriminating against noncoherent radiation present therein, as in claim 1, said holographic optical element comprising a turret arrangement of multiple holographic optical elements rotatable about the optical axis of the detector, wherein any one of the multiple holographic elements can be rotated in front of the detector.

16. A method for detecting coherent radiation present in input radiation while discriminating against noncoherent radiation present therein comprising:
   a. utilizing a holographic optical element for receiving the input radiation and for focusing coherent radiation therein to a spot or array of spots at an output plane while discriminating against and not focusing noncoherent radiation therein, said holographic optical element being a hologram recorded on a recording medium which, upon being illuminated with coherent radiation, replicates the wavefront used to originally expose the recorded medium;
   b. detecting the spot or array of spots;
   c. analyzing the position of the spot or array of spots to determine characteristics of the coherent radiation.

17. A method for detecting coherent radiation present in input radiation while discriminating against non-coherent radiation present therein, as in claim 16, said step of analyzing comprising analyzing the positions of said spot or array of spots to determine the wavelength of each source of coherent radiation present in the input radiation.

18. A method for detecting coherent radiation present in input radiation while discriminating against non-coherent radiation present therein, as in claim 16, said step of analyzing comprising analyzing the positions of said spot or array of spots to determine the angle of incidence of each source of coherent radiation present in the input radiation.

19. A method for detecting coherent radiation present in input radiation while discriminating against non-coherent radiation present therein, as in claim 16, said step of analyzing comprising analyzing the size of the spot or array of spots to determine the wavelength of the coherent radiation present in the input radiation.

20. A method for detecting coherent radiation present in input radiation while discriminating against non-coherent radiation present therein, as in claim 16, wherein said step of utilizing a holographic optical element includes utilizing a multiple holographic optical lens for focusing a single source of coherent radiation to an array of spots at the output plane.

21. A method for detecting coherent radiation present in input radiation while discriminating against non-coherent radiation present therein, as in claim 20, wherein said multiple holographic lens directs wavelengths $\lambda_1$ to $\lambda_n$ to different sectors 1 to n, and said step of detecting includes detecting the presence of any one of wavelengths $\lambda_1$ to $\lambda_n$ in any of the different sectors 1 to n.

22. A method for detecting coherent radiation present in input radiation while discriminating against non-coherent radiation present therein, as in claim 16, wherein said step of utilizing a holographic optical element includes utilizing a single holographic optical lens for focusing a single source of coherent radiation to a single spot at the output plane.

23. A method for detecting coherent radiation present in input radiation while discriminating against non-coherent radiation present therein, as in claim 16, wherein said step of detecting comprises detecting with a television camera.

24. A method for detecting coherent radiation present in input radiation while discriminating against non-coherent radiation present therein, as in claim 23, further including the step of attenuating bright coherent radiation to prevent pixel saturation of the television camera by the bright coherent radiation.

25. A method for detecting coherent radiation present in input radiation while discriminating against non-coherent radiation present therein, as in claim 23, wherein the television camera generates video signals, and further including the step of recording the video signals of said television camera.

26. A method for detecting coherent radiation present in input radiation while discriminating against non-coherent radiation present therein, as in claim 16, wherein said step of detecting comprises detecting with a film camera.

27. A method for detecting coherent radiation present in input radiation while discriminating against non-coherent radiation present therein, as in claim 16, wherein said step of detecting comprises detecting with an instant print film camera.

28. A method for detecting coherent radiation present in input radiation while discriminating against non-coherent radiation present therein, as in claim 16, further including the step of expanding the field of view being detected with a truncated cone having an internal mirrored surface.

29. A method for detecting coherent radiation present in input radiation while discriminating against non-coherent radiation present therein, as in claim 16, wherein said step of utilizing a holographic optical element includes the step of rotating a turret arrangement of a plurality of holographic optical elements to selectively position one of the plurality of holographic elements in a position to enable said step of detecting to be performed on the output of said one holographic element.

* * * * *